(12) United States Patent
Pinel et al.

(10) Patent No.: US 10,650,240 B2
(45) Date of Patent: May 12, 2020

(54) MOVIE CONTENT RATING

(71) Applicant: International Business Machines Corporation, Armonk, NY (US)

(72) Inventors: Florian Pinel, New York, NY (US); Russell P. Bobbitt, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/136,070

(22) Filed: Sep. 19, 2018

(65) Prior Publication Data

US 2020/0089960 A1    Mar. 19, 2020

(51) Int. Cl.
*G06K 9/00* (2006.01)
*H04N 21/466* (2011.01)
*G06F 16/71* (2019.01)

(52) U.S. Cl.
CPC ......... *G06K 9/00718* (2013.01); *G06F 16/71* (2019.01); *G06K 9/00765* (2013.01); *H04N 21/4665* (2013.01)

(58) Field of Classification Search
CPC .......... G06K 9/00718; G06K 9/00765; G06F 16/71; H04N 21/4665
See application file for complete search history.

(56) References Cited

U.S. PATENT DOCUMENTS

| | | | |
|---|---|---|---|
| 8,706,655 B1 * | 4/2014 | Rangarajan | G06F 15/18 |
| 9,137,573 B2 | 9/2015 | Nandi | |
| 9,246,875 B2 | 1/2016 | Mityagin | |
| 2008/0168490 A1 | 7/2008 | Yu | |
| 2013/0174194 A1 | 7/2013 | Mooneyham | |
| 2014/0156554 A1 | 6/2014 | Payne, IV | |
| 2015/0095014 A1 | 4/2015 | Marimuthu | |
| 2015/0271554 A1 * | 9/2015 | Shetty | H04N 21/4751 |
| 2016/0037220 A1 | 2/2016 | Feder et al. | |

FOREIGN PATENT DOCUMENTS

CN    105389558    3/2016

OTHER PUBLICATIONS

Helmer et al., "Film Classification by Trailer Features," Dec. 14, 2012, 5 pages.
Kabinsingha et al., "Movie Rating Approach and Application Based on Data Mining," International Journal of Engineering and Innovative Technology (IJEIT), vol. 2, Issue 1, Jul. 2012, pp. 77-83.

(Continued)

*Primary Examiner* — Anthony Bantamoi
(74) *Attorney, Agent, or Firm* — VanLeeuwen & VanLeeuwen; William J. Stock

(57) ABSTRACT

An approach is provided in which an information handling system trains a classifier using rated content segments that each has a first content type rating corresponding to a content type. Then, the information handling system uses the trained classifier to classify unrated content segments corresponding to an unrated content and generates second content type ratings for each of unrated content segments accordingly that identify a corresponding content type. In turn, the information handling system generates an overall content rating of the unrated content based on a combination of the second content type ratings.

20 Claims, 8 Drawing Sheets

(56) References Cited

OTHER PUBLICATIONS

Ionescu et al., "A naive mid-level concept-based fusion approach to violence detection in Hollywood movies," Proceedings of the 3rd ACM International Conference on Multimedia Retrieval (ICMR '13), Dallas, TX, Apr. 2013, pp. 215-222.

Changkaew et al., "Automatic Movie Rating Using Visual and Linguistic Information," 2010 First International Conference on Integrated Intelligent Computing, Bangalore, India, Aug. 2010, pp. 12-16.

* cited by examiner

MOVIE CONTENT RATING

BACKGROUND

Media content is available to a user from a wide variety of sources. Using today's mobile technologies, a user may view movies, television shows, home-made videos, etc., anywhere a satellite signal, broadcast signal, or Internet connection is available. Content producers typically rate movies and shows according to a particular standard in order to assist a user in determining age-appropriate content in which to view. The Motion Picture Association of America (MPAA) developed a rating system for motion pictures which provides parental guidance as well as viewing audience regulation (G, PG, PG-13, etc.). The Federal Communications Commission (FCC) also has a similar rating system for television programs, which are TV-Y, TV-MA, etc. The Entertainment Software Rating Board (ESRB) has a rating system pertaining to video games and apps, which are E, E-10+, T, M, and A. My Book Ratings (or MBR) has a rating system for book content, which are All Ages, Mild, Mild+, Moderate, Moderate+, and Adult. And, the Parent Advisory Label (PAL) provides a warning label for audio content that contains explicit content. The ratings discussed above pertain to a particular content as a whole and are typically based on public sentiment.

The MPAA uses various rating components to rate movies, such as violence, language, substance abuse, etc. and most large theater chains require a movie to have an MPAA rating before showing the movie. Unfortunately obtaining an MPAA rating for a movie is expensive and, some would argue, subjective to the opinions of a rating board. For example, violence must be kept to a minimum in G rated films and must not be intense in PG rated films. Depictions of intense violence are permitted under the PG-13 rating, but violence that is both realistic and extreme or persistent will generally receive at least an R rating. As can be seen, these guidelines are subjective and older generation board members typically have a different opinion than younger generation board members.

In addition, lower-budget films typically cannot afford the prices of the MPAA rating process. As such, the lower-budget films are not shown in large theaters and, in turn, are not able to receive a large amount of revenue relative to the MPAA rated movies.

BRIEF SUMMARY

According to one embodiment of the present disclosure, an approach is provided in which an information handling system trains a classifier using rated content segments that each has a first content type rating corresponding to a content type. Then, the information handling system uses the trained classifier to classify unrated content segments corresponding to an unrated content and generates second content type ratings for each of unrated content segments accordingly that identify a corresponding content type. In turn, the information handling system generates an overall content rating of the unrated content based on a combination of the second content type ratings.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
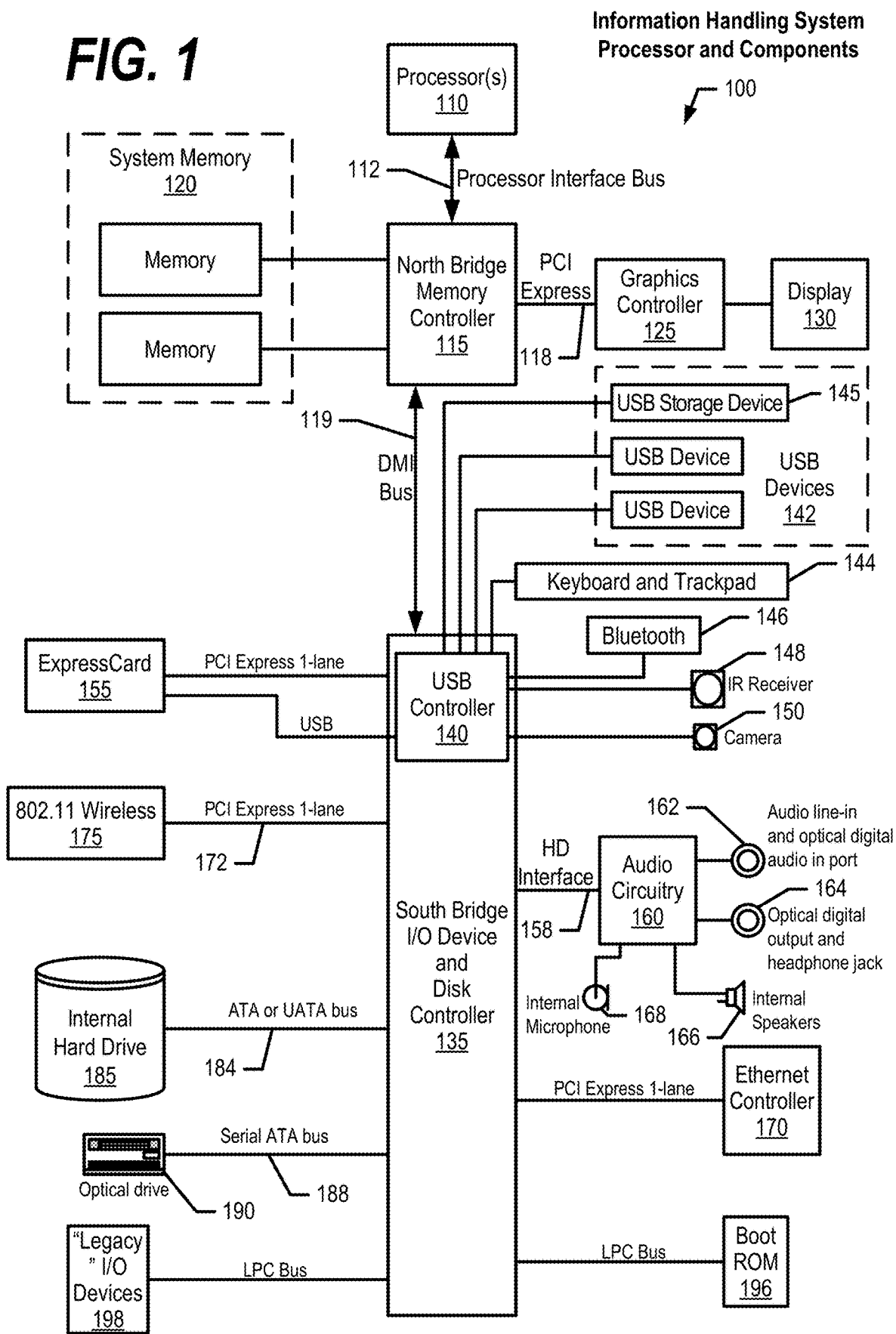
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, and etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
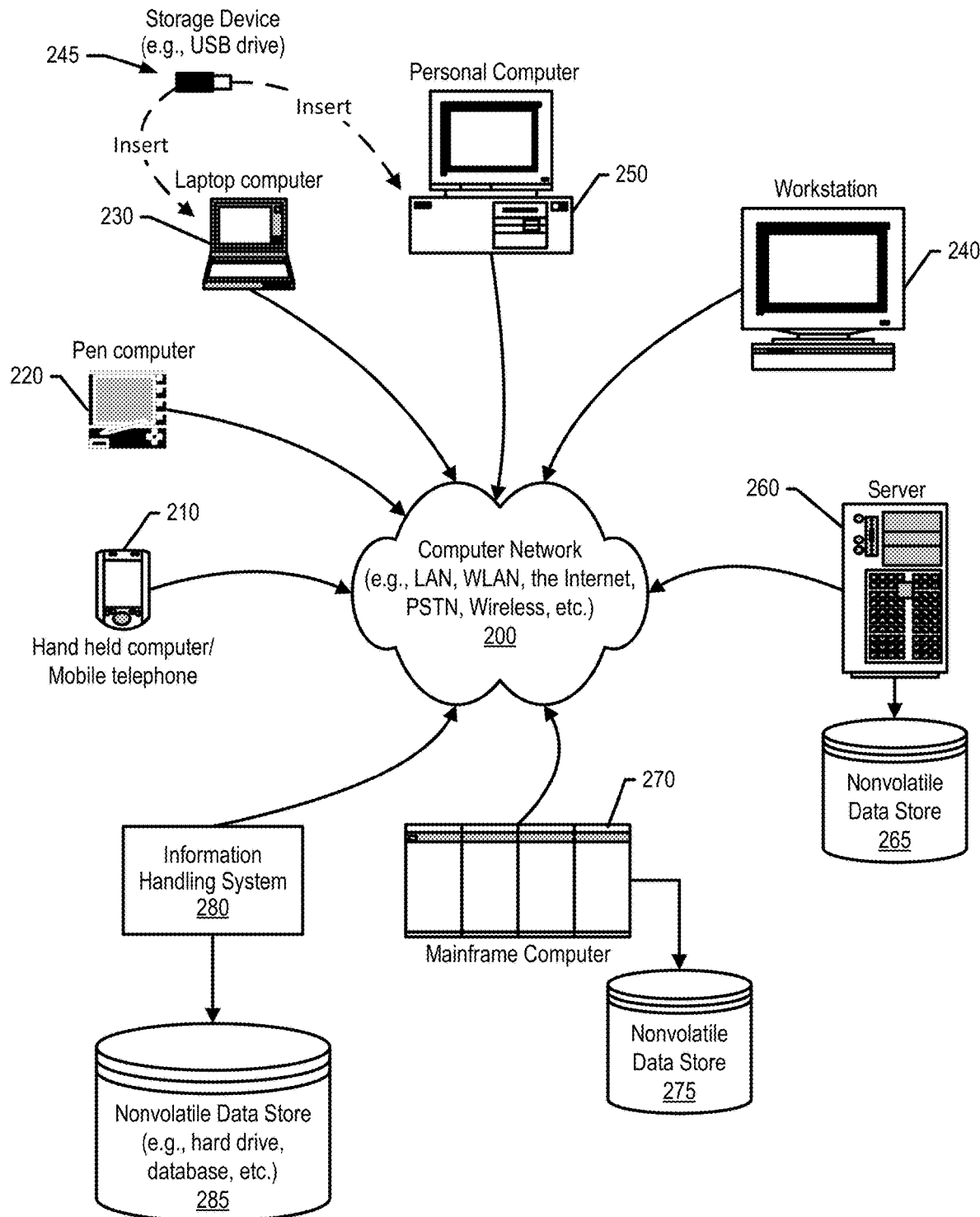
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, obtaining a rating for content is expensive and may be subjective. FIGS. 3 through 8 depict an approach that can be implemented on an information handling system that objectively and dynamically generates an overall content rating of content and provides rationale behind the overall content rating. The information handling system first segments rated content and then applies a content type rating to each segment based on input from multiple sources. As defined herein, content is any audio video media such as a movie, a television show, streaming media services, media (e.g., song), written content (e.g., book), video game, etc. Also defined herein, content types are types of content of which content is evaluated, such as language, substance abuse, violence, etc.

The information handling system then segments an unrated content and uses the trained classifier to classify each unrated segment according to the various content types. In turn, the information handling system generates an overall content rating of the unrated content based on the individual content type ratings.

In one embodiment, the information handling system displays a visual index that shows each unrated segment and their corresponding content type rating for each content type. In this embodiment, a user provides "what if" adjustments to the unrated content, such as changing a scene or removing a scene, and the information handling system re-computes an estimated overall rating based on the changes. As such, the information handling system provides real-time feedback to a user to achieve a desired overall content rating of the unrated content.

Figure 3:
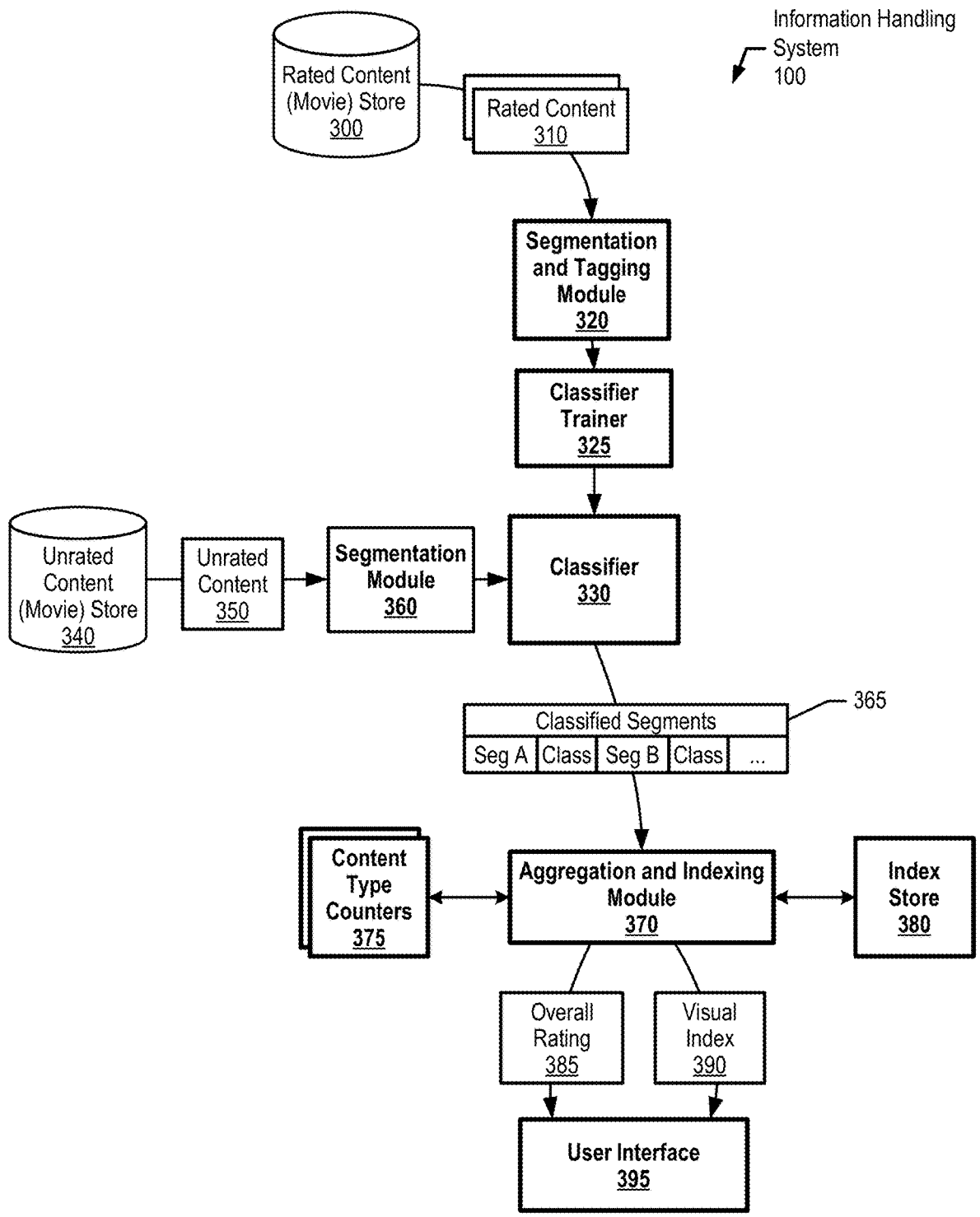
FIG. 3 is a high level diagram of an information handling system training a classifier using rated content and then using the trained classifier to classify unrated content segments and generate an overall content rating of the unrated content.

FIG. 3 is a high level diagram of an information handling system training a classifier using rated content and then using the trained classifier to classify unrated content segments and generate an overall content rating of the unrated content.

Information handling system 100 retrieves rated content 310 (e.g., rated movie) from rated content store 300 and uses segmentation and tagging module 320 to segment rated content 310 and add content type ratings to each segment based on a variety of sources. For example, segmentation and tagging module 320 may receive input from a group of individuals and/or from evaluating crowd source data that indicates a level of content type that is acceptable (e.g., a small amount of violence is acceptable for PG-13 movies) (see FIG. 4 and corresponding text for further details). In turn, classifier trainer 325 uses the tagged segments to train classifier 330.

Information handling system 100 then retrieves unrated content 350 (e.g., unrated movie) from unrated content store 340. Segmentation module 360 segments unrated content 350 based on, for example, scene changes, breaks in audio, different visual lighting, digital bookmarks, etc. Classifier 330 analyzes each unrated content segment individually and assigns (classifies) a content type rating for one or more content types accordingly.

In turn, classifier 330 generates classified segments 365, which includes the unrated content segments and their corresponding content type ratings (confidence scores). Aggregation and indexing module 370 evaluate the content segments and their corresponding ratings to generate an overall content rating 385 for unrated content 350.

In one embodiment, aggregation and indexing module 370 increments content type counters 375 for each content type rating of each content segment if the rating exceeds a certain threshold. For example, when a rating threshold is set to 0.50 (50% confidence), segment C may have a language content type rating of 0.57 and segment D may have a language content type rating of 0.1. Since 0.57>0.5 and 0.1<0.5, aggregation and indexing module 370 increments a violence content type counter by 1. In this embodiment, after analyzing each of the unrated segments, aggregation and indexing module 370 evaluates each of the content type counters and computes an overall content rating. This embodiment sets pre-defined thresholds of rating the unrated content as a whole and assigns an overall rating to the content accordingly. For example, one or two violent scenes generates an overall rating of PG-13, but seven or eight violent scenes generates an overall rating of R.

In another embodiment, a second classifier replaces the pre-defined threshold to determine the overall rating. This second classifier takes an input the segment count for each content type, and returns a suggested overall rating. The second classifier is trained using the rated segments produced by 320 and the overall ratings of 310.

Aggregation and indexing module 370 also logs the content type ratings for each content type on a segment by segment basis in index store 380. In turn, aggregation and indexing module 370 generates visual index 390, which displays on user interface 395 and provides rationale of overall rating 385 (see FIG. 5 and corresponding text for further details).

In one embodiment, information handling system 100 receives "what if" adjustments to unrated content 350 and computes an estimated overall rating. For example, when a user views visual index 390 and identifies a scene with a very high language content type rating that results in the overall rating 385 being R rated, the user provides a different audio track of the scene to see if a less vulgar audio will decrease the overall content rating to PG-13 (see FIG. 8 and corresponding text for further details).

Figure 4:
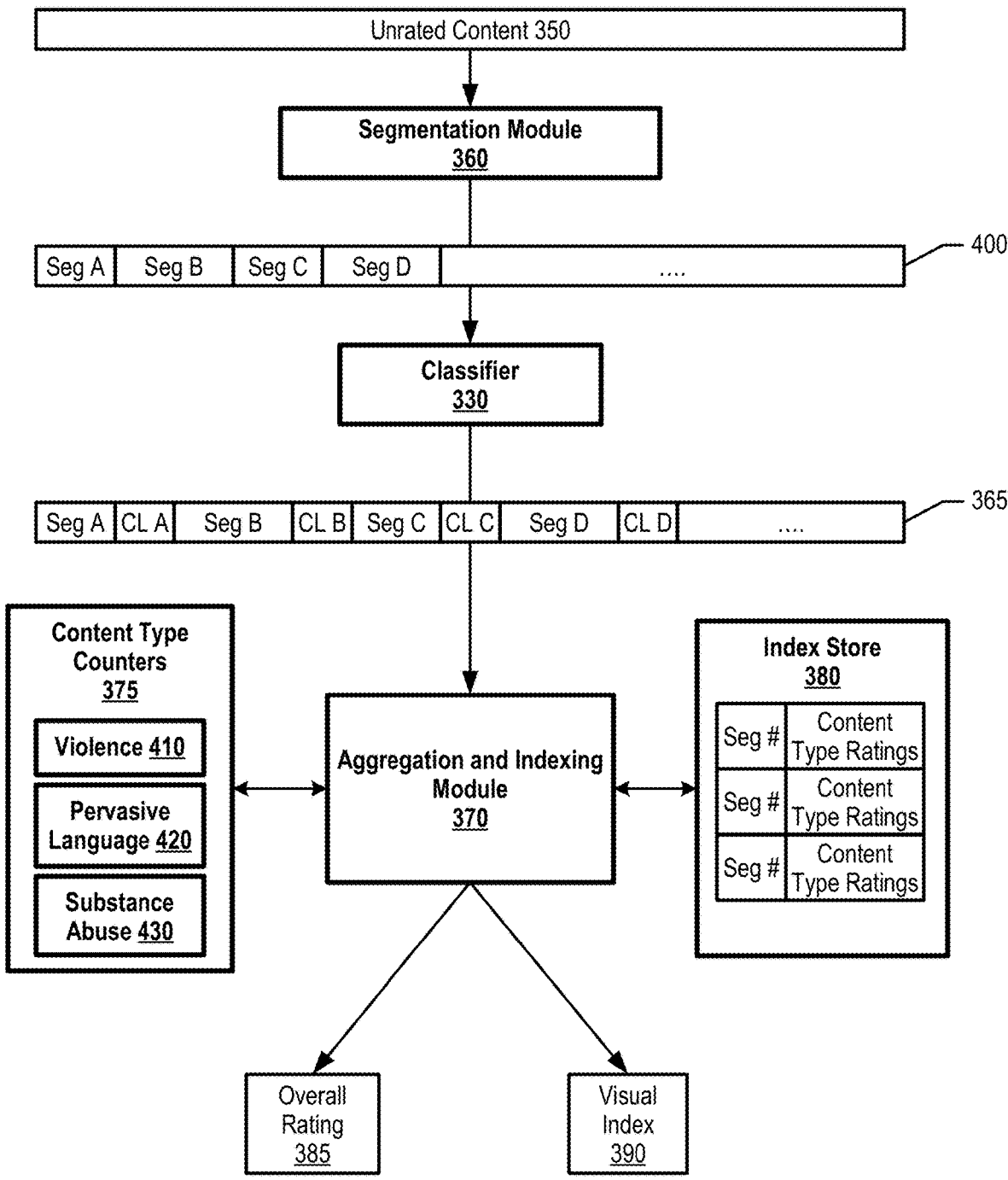
FIG. 4 is an exemplary diagram depicting an information handling system using a trained classifier to determine an overall rating of unrated content.

FIG. 4 is an exemplary diagram depicting an information handling system using a trained classifier to determine an overall rating of unrated content. Segmentation module 360 parses unrated content 350 into segments 400 based on, for example, scene changes, lighting changes, audio level changes, digital bookmarks, segment duration, etc. Next, trained classifier 330 assigns classifications (content type ratings) to each segment accordingly, resulting in classified segments 365.

Aggregation and indexing module 370 analyzes each segment and their content type ratings and increments content type counters 375 accordingly as discussed herein. FIG. 4 shows that content type counters 375 includes individual counters for violence 410, pervasive language 420, and substance abuse 430. In one embodiment, content type counters 375 includes more, less, or different counters than what is shown in FIG. 4.

Aggregation and indexing module 370 also stores the individual content type ratings with their corresponding segment index in index store 380. In turn, aggregation and indexing module 370 uses the contents in index store 380 to generate visual index 390 (see FIG. 5 and corresponding text for further details).

Figure 5:
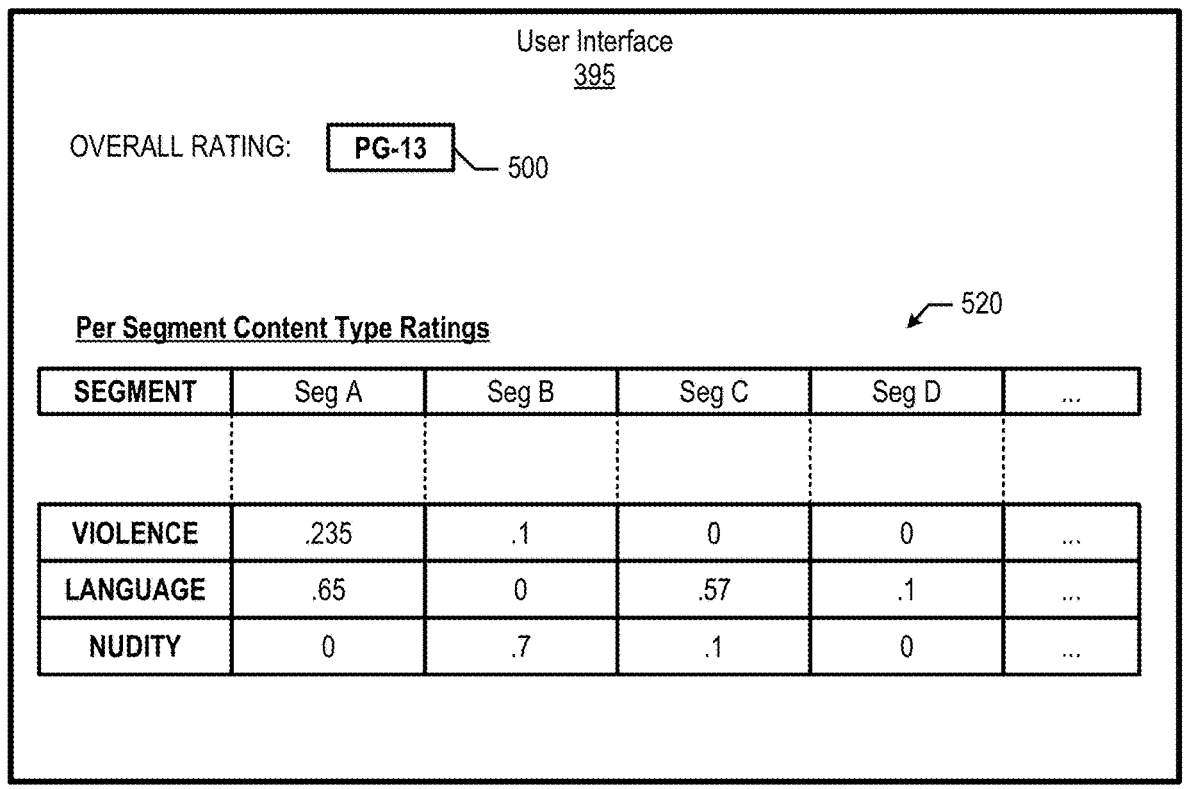
FIG. 5 is an exemplary diagram depicting user interface that displays an overall content rating and per segment content type ratings.

FIG. 5 is an exemplary diagram depicting user interface that displays an overall content rating and per segment content type ratings. User interface 395 shows overall content rating 500, which is the rating classification for unrated content 350. In addition, user interface 395 shows per segment content type ratings 520 based on visual index 390, which provides rationale on a per segment, per content type basis as to overall content rating 500. For example, a user may detect that segments A and C have high language content type ratings and the user then provides different audio tracks for segments A and C to see if the overall content rating changes. If so, the user replaces the audio in segments A and C to obtain the lower rating. In one embodiment, the use may correct a rating. For example, if detect any strong language in segment C, the user may change the rating to 0.

Figure 6:
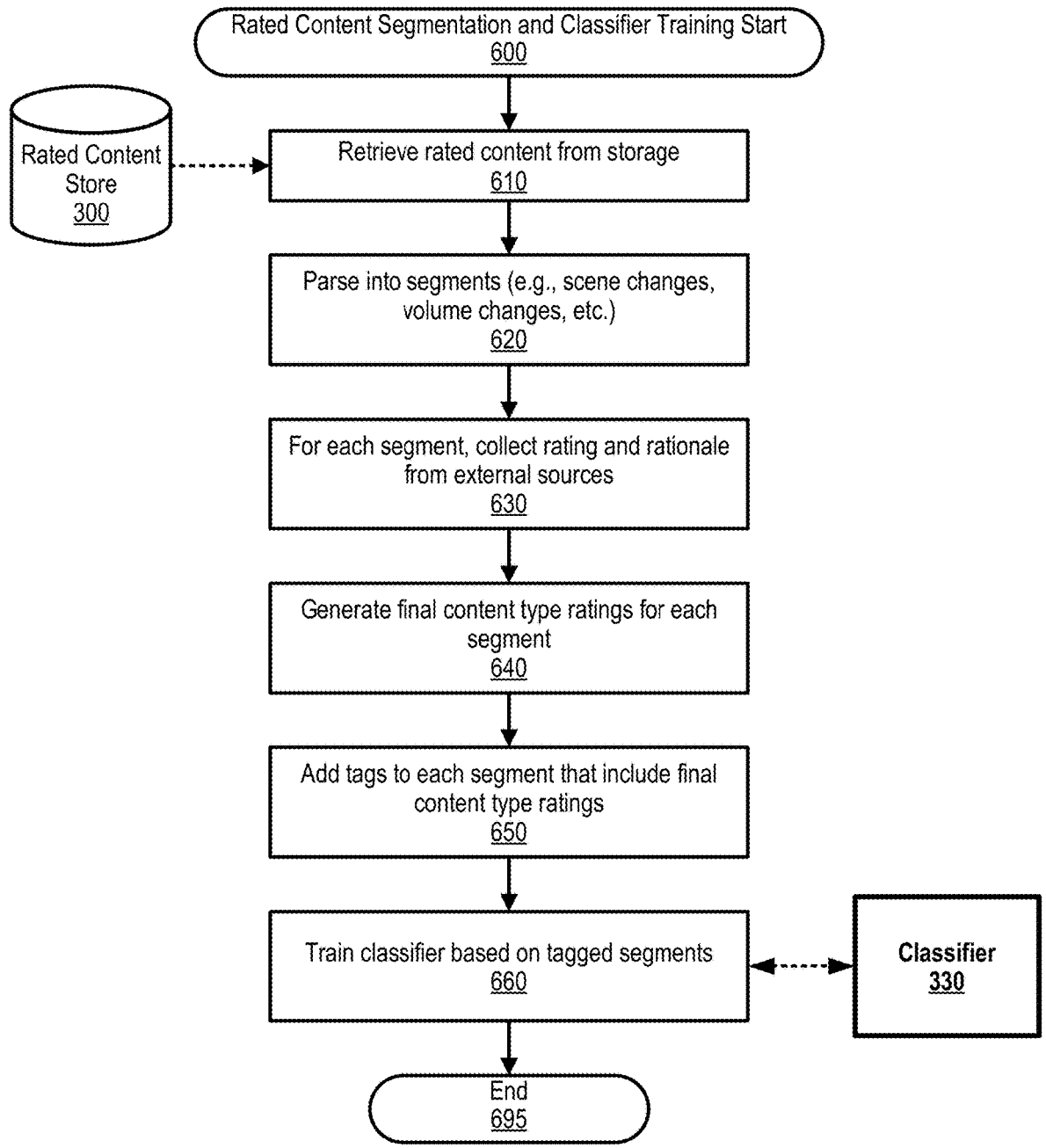
FIG. 6 is an exemplary flowchart depicting steps taken to segment rated content and individually rate the segmented content.

FIG. 6 is an exemplary flowchart depicting steps taken to segment rated content and individually rate the segmented content. FIG. 6 processing commences at 600 whereupon, at step 610, the process retrieves rated content 310 from storage. At step 620, the process parses the rated content into segments based on, for example, scene changes, volume changes, etc.

At step 630, the process collects ratings and rationale from external sources for each segment. In one embodiment, the process employs a diverse group of evaluators to evaluate the segments. In another embodiment, the process uses crowd source information to compare a segment to industry acceptable criteria. At step 640, the process generates final content type ratings for each segment based on the collected input, such as violence=0.2, language=0.4, etc. for a particular segment. At step 650, the process adds tags to each segment that include the final content type ratings. At step 660, the process trains classifier 330 using the segments and content type ratings. FIG. 6 processing thereafter ends at 695.

Figure 7:
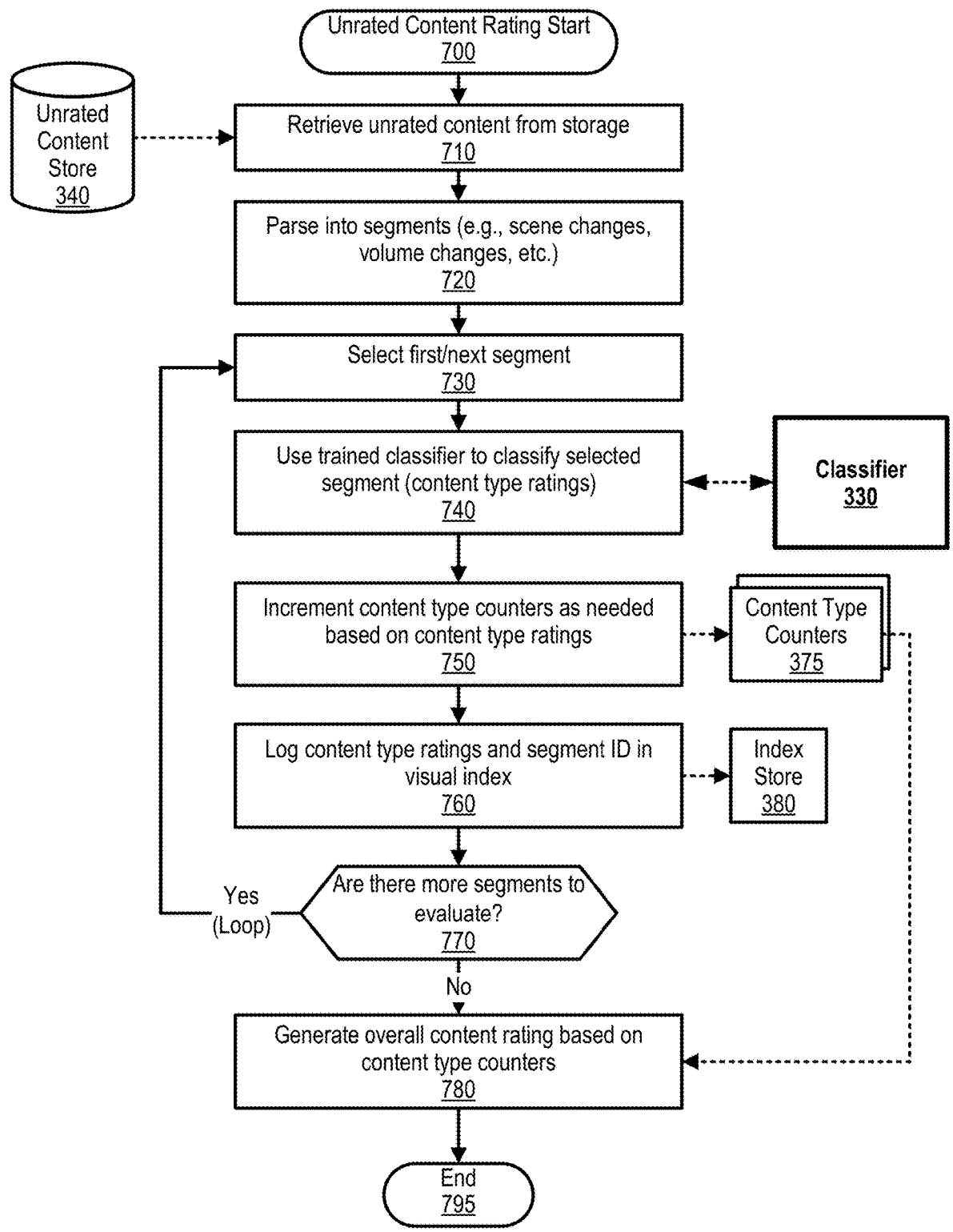
FIG. 7 is an exemplary flowchart showing steps taken to classify unrated segmented content and generate an overall content rating using the classified unrated segmented content.

FIG. 7 is an exemplary flowchart showing steps taken to classify unrated segmented content and generate an overall content rating using the classified unrated segmented content.

FIG. 7 processing commences at 700 whereupon, at step 710, the process retrieves unrated content 350 from storage. At step 720, the process parses the unrated content into segments (e.g., scene changes, volume changes, etc.). At step 730, the process selects the first segment and, at step 740, the process uses trained classifier 330 to classify selected segment (assign content type ratings to each segment).

At step 750, the process increments content type counters 375 as needed based on the segment's content type ratings. As discussed earlier, in one embodiment, the process utilizes an aggregated approach (content viewed as a whole) to determine an overall content rating. In this embodiment, the process sets a rating threshold, such as 0.50 (50% confidence), and the process increments the corresponding content type counter for segments having a confidence score higher than the threshold. Then, after analyzing each of the unrated segments, aggregation and indexing module 370 evaluates each of the content type counters and computes an overall content rating. In another embodiment, the process utilizes a max content type rating approach (single scene max value) to determine an overall content rating.

At step 760, the process logs the content type ratings with the corresponding segment ID in index store 380. The process determines as to whether there are more segments to evaluate (decision 770). If are there more segments to evaluate, then decision 770 branches to the 'yes' branch which loops back to select and process the next segment. This looping continues until there are no more segments to evaluate, at which point decision 770 branches to the 'no' branch exiting the loop. At step 780, the process generates an overall content rating of the unrated content based on the content type counter values and pre-defined rating threshold values (e.g., G, PG, PG-13). FIG. 7 processing thereafter ends at 795.

Figure 8:
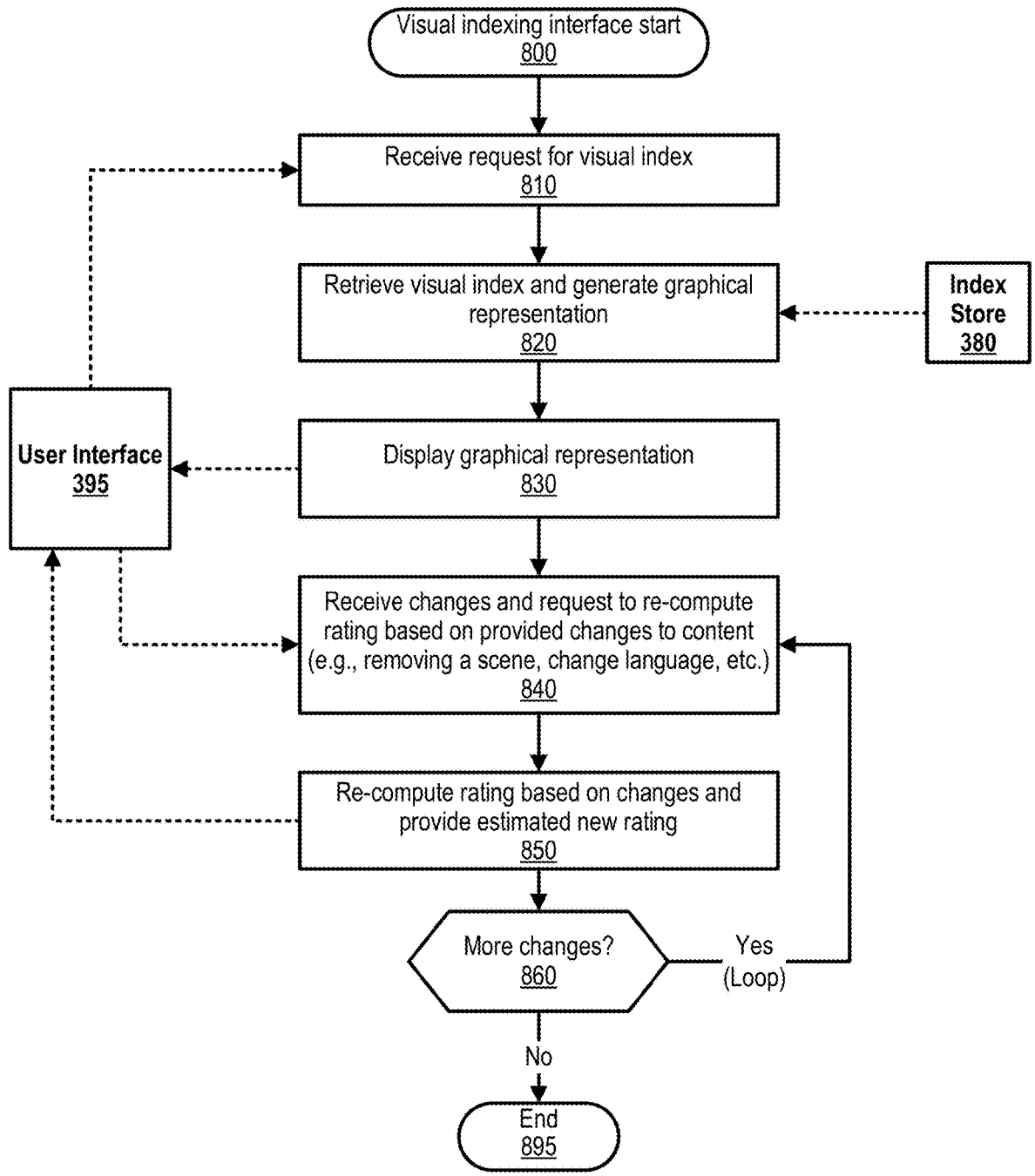
FIG. 8 is an exemplary flowchart showing steps taken to display a visual index and receive "what-if" adjustments to individual segments.

FIG. 8 is an exemplary flowchart showing steps taken to display a visual index and receive "what-if" adjustments to individual segments. FIG. 8 processing commences at 800 whereupon, at step 810, the process receives a request to view a video index. At step 820, the process retrieves video index information from index store 380 and generates a graphical representation. At step 830, the process displays the graphical representation on user interface 395 that shows each segment and their corresponding content type ratings (see FIG. 5 and corresponding text for further details).

At step 840, the process receives changes from a user that requests a re-computation of the overall content rating based on the changes (e.g., removing a scene, changing audio, etc.). At step 850, the process re-computes the overall content rating based on the changes and provides estimated "what-if" new overall content rating.

The process determines as to whether the user requests more changes (decision 860). If the user requests more changes, then decision 860 branches to the 'yes' branch which loops back to receive and process the additional changes. This looping continues until no more changes are requested, at which point decision 860 branches to the 'no' branch exiting the loop. FIG. 8 processing thereafter ends at 895.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:

training a classifier against a plurality of rated content segments each having at least one of a plurality of first content type ratings corresponding to one of a plurality of content types;

segmenting an unrated content into a plurality of unrated content segments, wherein the plurality of unrated content segments comprises a first unrated content segment;

classifying, by the trained classifier, each of the plurality of unrated content segments, wherein the classifying generates a plurality of second content type ratings corresponding to the plurality of unrated content segments, each of the plurality of second content type ratings corresponding to at least one of the plurality of content types;

generating an overall content rating of the unrated content based on a combination of the plurality of second content type ratings;

receiving a second unrated content segment to replace the first unrated content segment in response to generating the overall content rating;

adjusting at least one of the plurality of second content type ratings based on the second unrated content segment; and generating an adjusted overall content rating of the unrated content based on the adjusted at least one second content type rating.

2. The method of claim 1 further comprising:

grouping the plurality of second content type ratings into one of a plurality of content type groups based on their corresponding one of the plurality of content types;

computing a content type group rating for each of the plurality of content type groups based on their corresponding grouped plurality of second content type ratings, resulting in a plurality of content type group ratings; and generating the overall content rating based on the plurality of content type group ratings.

3. The method of claim 2 wherein the overall content rating corresponds to a set of pre-defined rating classifications with a set of pre-defined thresholds, the method further comprising:

for each one of the plurality of content type groups, the computing further comprises:

aggregating their corresponding plurality of second content type ratings;

identifying one of the pre-defined thresholds of which the aggregated second content type ratings reaches; and selecting one of the set of pre-defined rating classifications corresponding to the identified pre-defined threshold; and generating the overall content rating based on combining the selected pre-defined rating classifications for each of the plurality of content type groups.

4. The method of claim 2 wherein the overall content rating corresponds to a set of pre-defined rating classifications with a set of pre-defined thresholds, the method further comprising:

determining that at least one of the plurality of second content type ratings exceeds a selected one of the set of pre-defined thresholds; and setting the overall content rating to a selected one of the set of pre-defined ratings classifications that correspond to the selected pre-defined threshold.

5. The method of claim 1 further comprising:

for each of a selected one the plurality of second content type ratings:

identifying a selected one of the plurality of content types corresponding to the selected content type rating;

comparing the selected content type rating against a pre-determined threshold corresponding the selected content type;

incrementing one of a plurality of content type counters corresponding to the selected content type in response to the selected content type rating exceeding the pre-determined threshold; and generating the overall content rating based on a combination of the plurality of content type counters.

6. The method of claim 1 further comprising:

generating a visual index that identifies each of the plurality of unrated content segments and each of their corresponding at least one of the plurality of second content type ratings and their identified content type; and displaying the visual index and the overall content rating on a display.

7. The method of claim 1 wherein at least one of the plurality of content types is selected from the group consisting of a language content type, a violence content type, and a substance abuse content type.

8. An information handling system comprising:

one or more processors;

a memory coupled to at least one of the processors;

a set of computer program instructions stored in the memory and executed by at least one of the processors in order to perform actions of:

training a classifier against a plurality of rated content segments each having at least one of a plurality of first content type ratings corresponding to one of a plurality of content types;

segmenting an unrated content into a plurality of unrated content segments, wherein the plurality of unrated content segments comprises a first unrated content segment;

classifying, by the trained classifier, each of the plurality of unrated content segments, wherein the classifying generates a plurality of second content type ratings corresponding to the plurality of unrated content segments, each of the plurality of second content type ratings corresponding to at least one of the plurality of content types;

generating an overall content rating of the unrated content based on a combination of the plurality of second content type ratings;

receiving a second unrated content segment to replace the first unrated content segment in response to generating the overall content rating;

adjusting at least one of the plurality of second content type ratings based on the second unrated content segment; and generating an adjusted overall content rating of the unrated content based on the adjusted at least one second content type rating.

9. The information handling system of claim 8 wherein the processors perform additional actions comprising:

grouping the plurality of second content type ratings into one of a plurality of content type groups based on their corresponding one of the plurality of content types;

computing a content type group rating for each of the plurality of content type groups based on their corresponding grouped plurality of second content type ratings, resulting in a plurality of content type group ratings; and generating the overall content rating based on the plurality of content type group ratings.

10. The information handling system of claim 9 wherein the overall content rating corresponds to a set of pre-defined rating classifications with a set of pre-defined thresholds, the processors performing additional actions comprising:

for each one of the plurality of content type groups, the computing further comprises:

aggregating their corresponding plurality of second content type ratings;

identifying one of the pre-defined thresholds of which the aggregated second content type ratings reaches; and selecting one of the set of pre-defined rating classifications corresponding to the identified pre-defined threshold; and generating the overall content rating based on combining the selected pre-defined rating classifications for each of the plurality of content type groups.

11. The information handling system of claim 9 wherein the overall content rating corresponds to a set of pre-defined rating classifications with a set of pre-defined thresholds, the processors performing additional actions comprising:

determining that at least one of the plurality of second content type ratings exceeds a selected one of the set of pre-defined thresholds; and setting the overall content rating to a selected one of the set of pre-defined ratings classifications that correspond to the selected pre-defined threshold.

12. The information handling system of claim 8 wherein the processors perform additional actions comprising:

for each of a selected one the plurality of second content type ratings:

identifying a selected one of the plurality of content types corresponding to the selected content type rating;

comparing the selected content type rating against a pre-determined threshold corresponding the selected content type;

incrementing one of a plurality of content type counters corresponding to the selected content type in response to the selected content type rating exceeding the pre-determined threshold; and generating the overall content rating based on a combination of the plurality of content type counters.

13. The information handling system of claim 8 wherein the processors perform additional actions comprising:

generating a visual index that identifies each of the plurality of unrated content segments and each of their corresponding at least one of the plurality of second content type ratings and their identified content type; and displaying the visual index and the overall content rating on a display.

14. The information handling system of claim 8 wherein at least one of the plurality of content types is selected from the group consisting of a language content type, a violence content type, and a substance abuse content type.

15. A computer program product stored in a computer readable storage medium, comprising computer program code that, when executed by an information handling system, causes the information handling system to perform actions comprising:

training a classifier against a plurality of rated content segments each having at least one of a plurality of first content type ratings corresponding to one of a plurality of content types;

segmenting an unrated content into a plurality of unrated content segments, wherein the plurality of unrated content segments comprises a first unrated content segment;

classifying, by the trained classifier, each of the plurality of unrated content segments, wherein the classifying generates a plurality of second content type ratings corresponding to the plurality of unrated content segments, each of the plurality of second content type ratings corresponding to at least one of the plurality of content types;

generating an overall content rating of the unrated content based on a combination of the plurality of second content type ratings;

receiving a second unrated content segment to replace the first unrated content segment in response to generating the overall content rating;

adjusting at least one of the plurality of second content type ratings based on the second unrated content segment; and generating an adjusted overall content rating of the unrated content based on the adjusted at least one second content type rating.

16. The computer program product of claim 15 wherein the information handling system performs further actions comprising:

grouping the plurality of second content type ratings into one of a plurality of content type groups based on their corresponding one of the plurality of content types;

computing a content type group rating for each of the plurality of content type groups based on their corresponding grouped plurality of second content type ratings, resulting in a plurality of content type group ratings; and generating the overall content rating based on the plurality of content type group ratings.

17. The computer program product of claim 16 wherein the overall content rating corresponds to a set of pre-defined rating classifications with a set of pre-defined thresholds, the information handling system performing additional actions comprising:

for each one of the plurality of content type groups, the computing further comprises:

aggregating their corresponding plurality of second content type ratings;

identifying one of the pre-defined thresholds of which the aggregated second content type ratings reaches; and selecting one of the set of pre-defined rating classifications corresponding to the identified pre-defined threshold; and generating the overall content rating based on combining the selected pre-defined rating classifications for each of the plurality of content type groups.

18. The computer program product of claim 16 wherein the overall content rating corresponds to a set of pre-defined rating classifications with a set of pre-defined thresholds, the information handling system performing additional actions comprising:

determining that at least one of the plurality of second content type ratings exceeds a selected one of the set of pre-defined thresholds; and setting the overall content rating to a selected one of the set of pre-defined ratings classifications that correspond to the selected pre-defined threshold.

19. The computer program product of claim 15 wherein the information handling system performs further actions comprising:

for each of a selected one the plurality of second content type ratings:

identifying a selected one of the plurality of content types corresponding to the selected content type rating;

comparing the selected content type rating against a pre-determined threshold corresponding the selected content type;

incrementing one of a plurality of content type counters corresponding to the selected content type in response to the selected content type rating exceeding the pre-determined threshold; and generating the overall content rating based on a combination of the plurality of content type counters.

20. The computer program product of claim 15 wherein the information handling system performs further actions comprising:

generating a visual index that identifies each of the plurality of unrated content segments and each of their corresponding at least one of the plurality of second content type ratings and their identified content type; and displaying the visual index and the overall content rating on a display.

* * * * *